US009979288B2

(12) United States Patent
Mao et al.

(10) Patent No.: US 9,979,288 B2
(45) Date of Patent: May 22, 2018

(54) SWITCHING MODE POWER SUPPLY WITH ADAPTIVE FREQUENCY

(71) Applicant: Chengdu Monolithic Power Systems Co., Ltd., Chengdu (CN)

(72) Inventors: Wei Mao, Chengdu (CN); Tianzhu Zhang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days. days.

(21) Appl. No.: 15/486,235

(22) Filed: Apr. 12, 2017

(65) Prior Publication Data

US 2017/0302175 A1 Oct. 19, 2017

(51) Int. Cl.
*H02M 3/157* (2006.01)
*H02M 3/158* (2006.01)

(52) U.S. Cl.
CPC ............ *H02M 3/157* (2013.01); *H02M 3/158* (2013.01)

(58) Field of Classification Search
CPC ...... H02M 3/145; H02M 3/155; H02M 3/157; H02M 3/158; H02M 2003/145; H02M 2003/155; H02M 2003/158
See application file for complete search history.

(56) References Cited

U.S. PATENT DOCUMENTS 6,329,801 B1 * 12/2001 Zuniga ................ H02M 3/1563 323/282
7,652,945 B2 * 1/2010 Chu .................... H02M 3/1588 323/271
7,791,909 B2 * 9/2010 Koo .................. H02M 3/33507 363/21.02
2011/0204860 A1 * 8/2011 Thiele .................. H02M 3/156 323/271
2012/0049822 A1 * 3/2012 Li ........................ H02M 3/156 323/282
2016/0187914 A1 6/2016 Li

* cited by examiner

*Primary Examiner* — Matthew Nguyen
(74) *Attorney, Agent, or Firm* — Perkins Coie LLP

(57) ABSTRACT

Switching mode power supply (SMPS) having a switch circuit and a controller. The switch circuit has an output inductor and a switch with a minimum on time. A control signal is generated by the controller to control the switching operation of the switch based on a clock signal with a switching frequency and an off signal. When the required on time of the switch is smaller than the minimum on time, the SMPS reduces the switching frequency adaptively and the actual on time of the switch is controlled to be the minimum on time.

21 Claims, 7 Drawing Sheets

200
22
Clock Circuit
222
IND
CLKx
Logic Circuit
Module Detection Circuit
OFF Signal Generator
OFFSET
221
223
225
MIN
Vin
21
S1
Vout
LD
GND

SWITCHING MODE POWER SUPPLY WITH ADAPTIVE FREQUENCY

CROSS REFERENCE

This application claims the benefit of CN application No. 201610227993.5, filed on Apr. 13, 2016, and incorporated herein by reference.

FIELD

The invention generally relates to a control method of a power supply, more specifically but not exclusively, relates to a switching mode power supply.

BACKGROUND

Switching mode power supply (SMPS) is widely used in portable electronic equipments. The SMPS has at least one switch, and for many reasons, the SMPS has a parameter of minimum on time Tmin which is defined as the minimum on time of the switch in one period. For example, the inherent signal delay of the logic circuit and the driver circuit in the SMPS causes the SMPS to have the minimum on time Tmin. Or in order to prevent false trigger of the switch, the designer sets the minimum on time Tmin for the SMPS on purpose. Recently, on one hand, the decreasing power dissipation of the portable electronic equipments requires a decreasing output voltage of the SMPS. On the other hand, the input voltage range of the SMPS should increase for broader application. So in the practical application, it is very common to require a SMPS has a high input voltage together with a low output voltage, thus the required on time of the SMPS becomes very small. In such a condition, when the required on time of the SMPS is smaller than the minimum on time Tmin, an over voltage issue will happen.

In light of the above description, a method is needed to solve at least one of the above problems.

SUMMARY

An embodiment of the present invention discloses a controller for controlling a switching mode power supply (SMPS), wherein the SMPS comprises a switch with a minimum on time, and the SMPS converts an input voltage to an output voltage, the controller comprising: a clock circuit, configured to generate a clock signal to control the turn on moment of the switch, wherein when the required on time of the switch for converting the input voltage to a target output voltage is bigger than the minimum on time, the frequency of the clock signal is controlled to be a preset frequency, when the required on time of the switch is smaller than the minimum on time, the frequency of the clock signal is controlled to be positively correlated to the required on time of the switch; an off signal generator, configured to generate an off signal to control the actual on time of the switch, wherein when the required on time of the switch is bigger than the minimum on time, the actual on time of the switch is controlled to be the required on time of the switch, when the required on time of the switch is smaller than the minimum on time, the actual on time of the switch is controlled to be the minimum on time; and a logic circuit, coupled to the clock circuit and the off signal generator, wherein the logic circuit is configured to control the switching operation of the switch based on the clock signal and the off signal.

An embodiment of the present invention discloses a switching mode power supply (SMPS) for converting an input voltage to an output voltage, the SMPS comprising: a switching circuit comprising a switch with a minimum on time; and a controller, comprising: a clock circuit, configured to generate a clock signal to control the turn on moment of the switch, wherein when the required on time of the switch for converting the input voltage to a target output voltage is bigger than the minimum on time, the frequency of the clock signal is controlled to be a preset frequency, when the required on time of the switch is smaller than the minimum on time, the frequency of the clock signal is controlled to be positively correlated to the required on time of the switch; an off signal generator, configured to generate an off signal to control the actual on time of the switch, wherein when the required on time of the switch is bigger than the minimum on time, the actual on time of the switch is controlled to be the required on time of the switch, when the required on time of the switch is smaller than the minimum on time, the actual on time of the switch is controlled to be the minimum on time; and a logic circuit, coupled to the clock circuit and the off signal generator, wherein the logic circuit is configured to control the switching operation of the switch based on the clock signal and the off signal.

An embodiment of the present invention discloses a method of controlling a SMPS, wherein the SMPS comprises a switch with a minimum on time, the SMPS converts an input voltage to an output voltage by controlling the switch, the method comprising: detecting if the required on time of the switch for converting the input voltage to a target output voltage is smaller than the minimum on time; and controlling the switching frequency of the SMPS to be smaller than a preset frequency of the SMPS and the actual on time of the switch to be the minimum on time when the required on time of the switch is detected being smaller than the minimum on time, and controlling the switching frequency of the SMPS to be the preset frequency of the SMPS and the actual on time of the switch to be the required on time of the switch when the required on time of the switch is detected being bigger than the minimum on time.

BRIEF DESCRIPTION OF THE DRAWINGS

The following detailed description of various embodiments of the present invention can best be understood when read in conjunction with the following drawings in which the features are not necessary drawn to scale but rather drawn as to best illustrate the pertinent features.

The use of the similar reference label in different drawings indicates the same of like components.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled" as used herein, is defined as directly or indirectly connected in an electrical or non-electrical manner. The terms "a", "an" and "the" include plural reference and the term "in" includes "in" and "on". The phrase "in one embodiment" as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
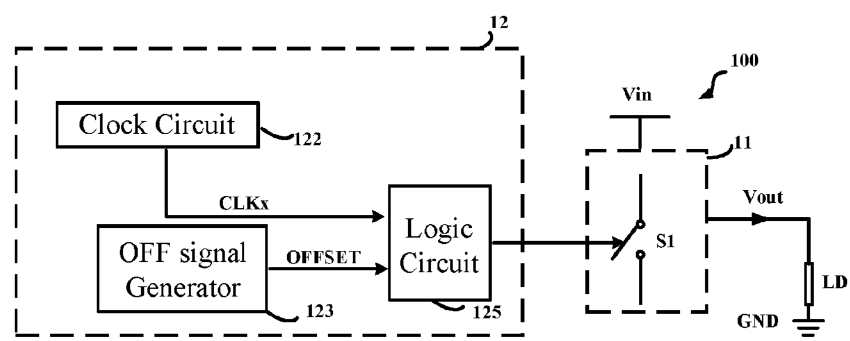
FIG. 1 illustrates a block diagram of a SMPS 100 with adaptive clock generation in accordance with an embodiment of the present invention.

FIG. 1 illustrates a block diagram of a SMPS 100 with adaptive clock generation in accordance with an embodiment of the present invention. The SMPS 100 comprises a switching circuit 11 and a controller 12. In the example of FIG. 1, the switching circuit 11 has an input terminal to receive an input voltage Vin and an output terminal to provide an output voltage Vout for a load LD. Herein, the labels Vin and Vout can also refer to an input terminal and an output terminal respectively. The switching circuit 11 comprises a switch S1. The SMPS 100 converts the input voltage Vin to a regulated output voltage Vout by controlling the switching operation of the switch S1. In an embodiment, The SMPS 100 comprises a DC-DC buck converter. In another embodiment, The SMPS 100 may comprise other topologies of DC-DC converter.

Referring to exemplary embodiment as shown in FIG. 1, the controller 12 comprises a clock circuit 122, an off signal generator 123 and a logic circuit 125. The clock circuit 122 provides a clock signal CLKx to control the turn-on moment of the switch S1 and to set the frequency of the SMPS 100. The required on time of the SMPS 100 Ton is defined as the required on time of the switch S1 for converting the input voltage Vin to a target output voltage Vout and the minimum on time of the SMPS 100 Tmin is defined as the minimum on time of the switch S1 in one period. When the required on time of the SMPS 100 Ton is bigger than the minimum on time Tmin, the frequency of the clock signal CLKx provided by the clock circuit 122 is F and the actual on time of the switch S1 is controlled to be equal to the required on time of the SMPS 100 Ton. In such a situation, the SMPS 100 has a preset frequency F. When the required on time of the SMPS 100 Ton is smaller than the minimum on time Tmin, which may caused by the high input voltage Vin and/or the low output voltage Vout, the frequency of the clock signal CLKx is Fx, wherein Fx is smaller than the preset frequency F. In an embodiment, the minimum on time Tmin may be a preset parameter determined by the designer. In an embodiment, the minimum on time Tmin is generated by the inherent signal delay of a logic circuit and of a driver circuit, such as the transfer delay of a comparator. The minimum on time Tmin may have a constant value or a variable value. In an embodiment, the minimum on time Tmin is set to be a constant value according to the relevant parameters of the SMPS. In another embodiment, the minimum on time Tmin is 50 ns for a SMPS with a frequency of 500 KHz.

In an embodiment, the frequency Fx of the clock signal CLKx is positively correlated to the required on time of the SMPS 100 Ton. In another embodiment, the frequency Fx of the clock signal CLKx is inversely correlated to the input voltage Vin and is positively correlated to the output voltage Vout. Specifically, when the input voltage Vin is fixed, the frequency Fx of the clock signal CLKx decreases with the decrease of the output voltage Vout. When the output voltage Vout is fixed, the frequency Fx of the clock signal CLKx decreases with the increase of the input voltage Vin.

The off signal generator 123 provides an off signal OFFSET to control the actual on time of switch S1. The logic circuit 125 has a first input terminal, a second input terminal and an output terminal, wherein the first input terminal is coupled to the output terminal of the clock circuit 122 to receive the clock signal CLKx, and the second input terminal is coupled to the off signal generator 123 to receive the off signal OFFSET. The logic circuit 125 generates a control signal at the output terminal based on the clock signal CLKx and the off signal OFFSET.

In the present invention, when the required on time of the SMPS 100 Ton is smaller than the minimum on time Tmin, the actual on time of the switch S1 is the minimum on time Tmin, and the working frequency of the SMPS 100 is Fx. As the frequency Fx of the clock signal CLKx is positively correlated to the required on time of the SMPS Ton, so the frequency Fx decreases with the decrease of the required on time of the SMPS 100 Ton. Thus even if the required on time of the SMPS Ton is smaller than the minimum on time Tmin, the output voltage Vout will not have an overvoltage issue. Compared with the traditional fixed frequency control, the output voltage Vout of the SMPS in this invention will not have an overvoltage issue. Compared with the traditional skipping frequency control, the output voltage ripple of the SMPS 100 in this invention is smaller. As shown in FIG. 1, if the required on time of the SMPS Ton is smaller than the minimum on time Tmin, the SMPS 100 can reduce the frequency adaptively to regulate the output voltage Vout.

Figure 2:
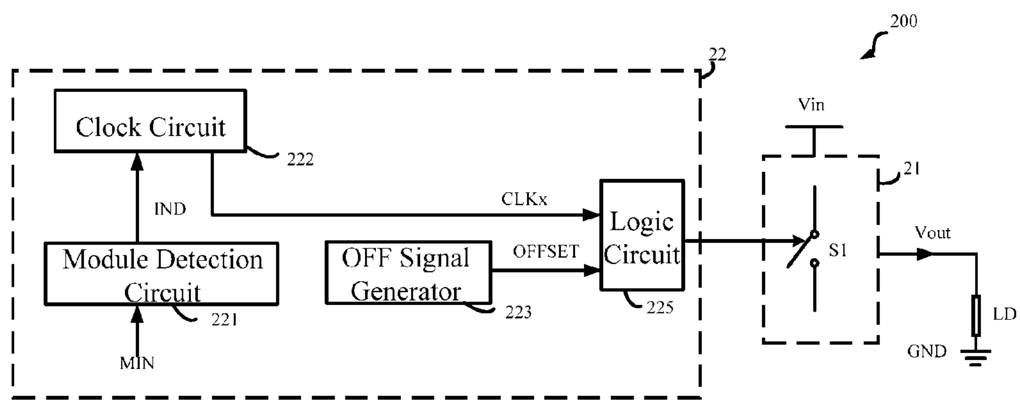
FIG. 2 illustrates a block diagram of a SMPS 200 in accordance with an embodiment of the present invention.

FIG. 2 illustrates a block diagram of a SMPS 200 in accordance with an embodiment of the present invention. The SMPS 200 comprises a switching circuit 21 and a controller 22. Compared with the SMPS 100 of FIG. 1, The SMPS 200 further comprises a module detection circuit 221. The module detection circuit 221 generates an indication signal IND which is then provided to the clock circuit 222 to set the working state of the clock circuit 222, based on the required on time of the SMPS 200 Ton and a minimum on time signal MIN indicative of the minimum on time Tmin. Specifically, when the module detection circuit 221 detects the required on time of the SMPS Ton is bigger than the minimum on time Tmin, the indication signal IND is in a first state, for example, a logic low state. Thus the clock circuit 222 generates a clock signal CLKx with a frequency of F, wherein F is the preset frequency of the SMPS 200. When the module detection circuit 221 detects the required on time of the SMPS Ton is smaller than the minimum on time Tmin, the indication signal IND is in a second state, for example, a logic high state. Thus the clock circuit 222 generates the clock signal CLKx with a frequency of Fx, wherein Fx is smaller than the preset frequency F. In an embodiment, clock circuit 222 detects the state of the indication signal IND at a particular moment to indicate if the required on time of the SMPS 100 Ton is bigger than the minimum on time Tmin. In an embodiment, the clock circuit 222 detects the logic state of the indication signal IND after a period of T since the turn-on moment of the switch S1. In another embodiment, other signals can be used as the indication signal IND. In an embodiment, the off signal OFFSET is used as the indication signal IND.

Figure 3A:
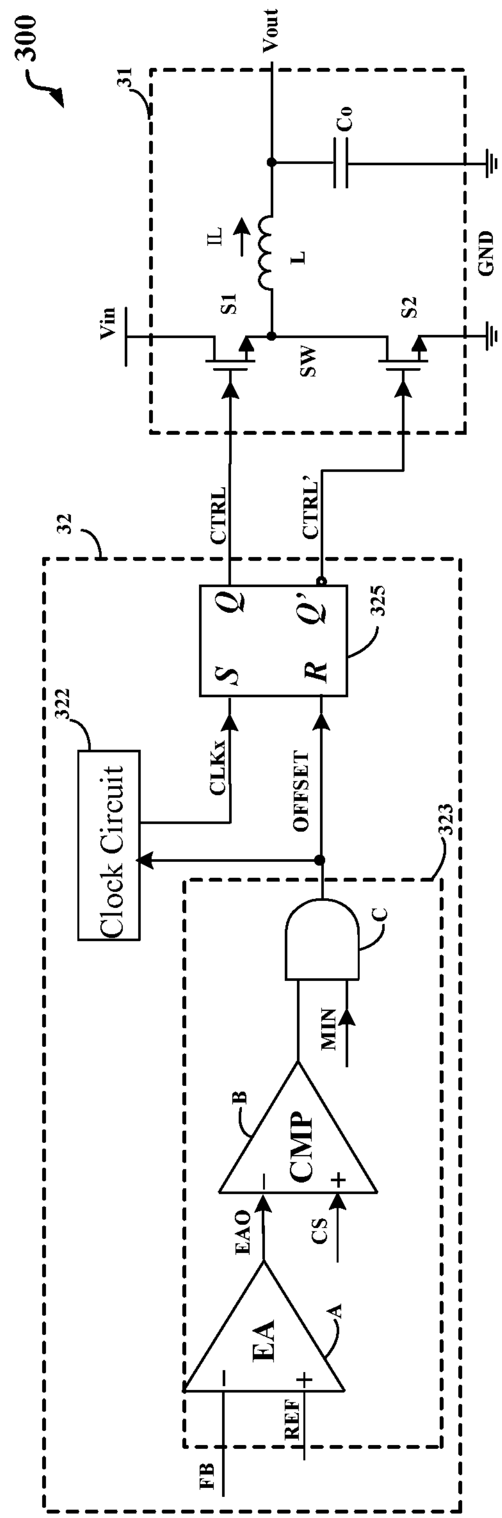
FIG. 3A illustrates a block diagram of a SMPS 300 in accordance with another embodiment of the present invention.

FIG. 3A illustrates a block diagram of a SMPS 300 in accordance with another embodiment of the present invention. The SMPS 300 comprises a switching circuit 31 and a controller 32. The switching circuit 31 comprises a DC-DC buck converter. The switching circuit 31 comprises a switch S1, a synchronous switch S2 and an output filter which comprises an output inductor L and an output capacitor Co. The switch S1 is coupled between an input voltage Vin and a switching node SW, and the synchronous switch S2 is coupled between the switching node SW and a reference ground GND. The output inductor L is coupled between the switching node SW and an output terminal Vout, and the output capacitor Co is coupled between the output terminal Vout and the reference ground GND. As shown in FIG. 3A, the switch S1 and the synchronous switch S2 each comprises a Metal Oxide Semiconductor Field Effect Transistor (MOSFET), and the MOSFET may be an enhanced N-Channel MOSFET. In another embodiment, the switch S1 and the synchronous switch S2 are P-channel MOSFETs. In an embodiment, the switch S1 and the synchronous switch S2 may be other type of transistors, such as Junction Field Effect Transistor (JFET) or Bipolar (BJT). In another embodiment, the synchronous switch S2 can be replaced by a non-synchronous switch, such as a diode. Switching circuit 31 further has a first control terminal to receive a first control signal CTRL and a second control terminal to receive a second control signal CTRL', wherein the first control terminal is coupled to a control terminal of the switch S1, the second control terminal is coupled to a control terminal of the synchronous switch S2. The first control signal CTRL and the second control signal CTRL' respectively control the switching operation of the switch S1 and the synchronous switch S2 to get a regulated output voltage Vout based on the input voltage at the input terminal Vin. The second control signal CTRL' is a complementary signal of the first control signal CTRL, or the second control signal CTRL' is a NOT signal of the first control signal CTRL. Thus when the first control signal CTRL is in a second state, for example, a logic high state, the second control signal CTRL' is in a first state, for example, a logic low state, and accordingly, the switch S1 is turned on and the synchronous switch S2 is turned off, and a current flows from the switch S1 and the output inductor L to the output capacitor Co. During this time period, an inductor current IL flowing through the output inductor L increases. When the first control signal CTRL is in the first state, for example, a logic low state, the second control signal CTRL' is in the second state, for example, a logic high state. Accordingly, the switch S1 is turned off and the synchronous switch S2 is turned on, and a current flows from the output capacitor Co to the output inductor L. During this time period, the inductor current IL flowing through the output inductor L decreases.

The controller 32 comprises a clock circuit 322, an off signal generator 323 and a logic circuit 325. The off signal generator 323 generates an off signal OFFSET based on an inductor current sense signal CS indicative of the inductor current IL flowing through the output inductor L and a feedback signal FB indicative of the output voltage Vout, and the off signal OFFSET is then provided to the logic circuit 325. In the SMPS 300 as FIG. 3A shows, the off signal generator 323 generates the off signal OFFSET based on the inductor current sense signal CS indicative of the inductor current IL and the feedback signal FB indicative of the output voltage Vout. However, in another embodiment, the SMPS 300 may utilize voltage control method and the off signal generator 323 don't need to detect the inductor current IL, the off signal OFFSET is generated based on the feedback signal FB indicative of the output voltage Vout and a slope signal. The slope signal is a signal that has a slope waveform in at least a phase of one period. In an embodiment, the slope signal is a signal that has a slope waveform during the on time of the switch S1. In another embodiment, the slope signal is a sawtooth waveform. Continuing to refer to FIG. 3A, the off signal generator 323 comprises an amplifier A, a comparator B and a logic circuit C. The amplifier A has a first input terminal (+), a second input terminal (−) and an output terminal, wherein the first input terminal is coupled to a reference signal REF, and the second input terminal is coupled to the feedback signal FB indicative of the output voltage Vout. The amplifier A generates an error amplified signal EAO based on the reference signal REF and the feedback signal FB indicative of the output voltage Vout. The comparator B has a first input terminal (+), a second input terminal (−) and an output terminal, wherein the first input terminal is coupled to the inductor current sense signal CS, and the second input terminal is coupled to the output terminal of the amplifier A to receive the error amplified signal EAO. The comparator B generates a comparison signal based on the error amplified signal EAO and the inductor current sense signal CS, and the comparison signal is then provided to the logic circuit C. The logic circuit C comprises an AND gate having a first input terminal, a second input terminal and an output terminal, wherein the first input terminal is coupled to the output terminal of the comparator B, the second input terminal receives a minimum on time signal MIN indicative of the minimum on time Tmin, and the output terminal generates the off signal OFFSET which is provided to the logic circuit 325. The minimum on time signal MIN is in a first state, for example a logic low state, to make sure the actual on time of the switch S1 is bigger than or equal to the minimum on time Tmin. The clock circuit 322 generates a clock signal CLKx based on the off signal OFFSET, and the clock signal CLKx is then provided to the logic circuit 325. In the example as FIG. 3A shows, the off signal OFFSET is reused as an indication signal IND. The clock circuit 322 detects the logic state of the off signal OFFSET after a period of T since the turn-on moment of the switch S1 to indicate if the required on time of the SMPS 300 Ton is smaller than the minimum on time Tmin, wherein T is the preset period of the clock signal CLKx with a frequency of F. If the clock circuit 322 detects the off signal OFFSET is in a first state after the period of T since the turn-on moment of the switch S1, this means the required on time of the SMPS Ton is bigger than the minimum on time Tmin, then the clock circuit 322 provides the clock signal CLKx with the frequency of F, wherein F is the preset frequency of the SMPS 300. If the off signal OFFSET is in a second state after the period of T since the turn-on moment of the switch S1, this means the required on time of the SMPS Ton is smaller than the minimum on time Tmin. Then clock circuit 322 provides the clock signal CLKx with a frequency of Fx, and the actual on time of the switch S1 is the minimum on time Tmin. The working frequency of the SMPS 300 is Fx which is smaller than the preset frequency F.

The logic circuit 325 comprises a RS-trigger having a setting terminal S, a resetting terminal R, a first output terminal Q and a second output terminal Q', wherein the setting terminal S is coupled to the clock circuit 322 to receive the clock signal CLKx, and the resetting terminal R is coupled to the off signal OFFSET. The RS-trigger generates the first control signal CTRL at the first output terminal Q and the second control signal CTRL' at the second output terminal Q' to control the switching operation of the switch S1 and the synchronous switch S2.

The required on time of the SMPS 300 Ton varies with the input voltage Vin and the output voltage Vout in the SMPS 300. In an embodiment, if the input voltage Vin is fixed, the required on time of the SMPS 300 Ton decreases with the decrease of the output voltage Vout. If the output voltage Vout is fixed, the required on time of the SMPS Ton decreases with the increase of the input voltage Vin. In an embodiment, when the required on time of the SMPS Ton is bigger than the minimum on time Tmin, the clock circuit 322 generates a clock signal CLKx with a preset frequency F. Accordingly, the switching frequency of the SMPS 300 is F. If the increase of the input voltage Vin and/or the decrease of the output voltage Vout causes the required on time of the SMPS Ton to be smaller than the minimum on time Tmin, the clock circuit 322 generates the clock signal CLKx with a frequency of Fx, and accordingly, the switching frequency of the SMPS 300 is Fx, wherein Fx is smaller than the preset frequency F. The frequency Fx of the clock signal CLKx is positively correlated to the required on time of the SMPS 300 Ton. Thus, when the required on time of the SMPS 300 Ton decreases due to the increase of the input voltage Vin or the decrease of the output voltage Vout, the frequency Fx of the clock signal CLKx decreases accordingly, and the frequency Fx of the clock signal CLKx is inversely correlated to the input voltage Vin and positively correlated to the output voltage Vout.

Figure 3B:
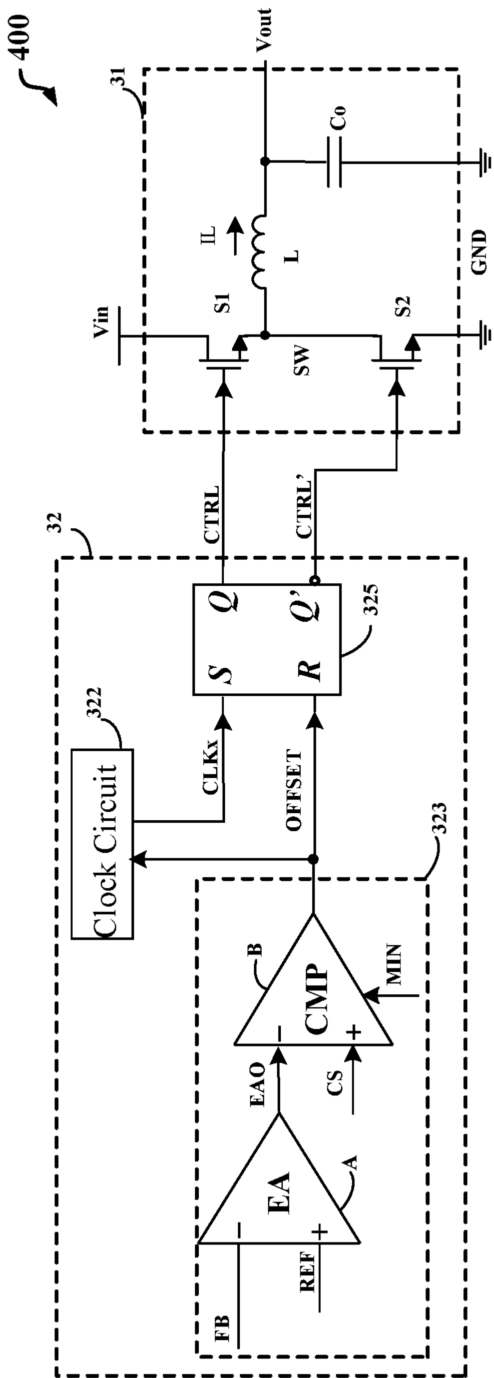
FIG. 3B illustrates a block diagram of a SMPS 400 in accordance with another alternative embodiment of the present invention.

FIG. 3B illustrates a block diagram of a SMPS 400 in accordance with another alternative embodiment of the present invention. Compared with the SMPS 300 shown in FIG. 3A that the off signal generator 323 of SMPS 400 does not comprise the logic circuit C, and the comparator B further has a control terminal to receive the minimum on time signal MIN. Based on the minimum on time signal MIN, the comparator B sets the off signal OFFSET in a first state during the minimum on time Tmin, for example a logic low state, to make sure the actual on time of the switch S1 is bigger than or equal to the minimum on time Tmin. In an embodiment, when the minimum on time signal MIN is in an effective state, the off signal OFFSET is in an ineffective state.

Figure 4:
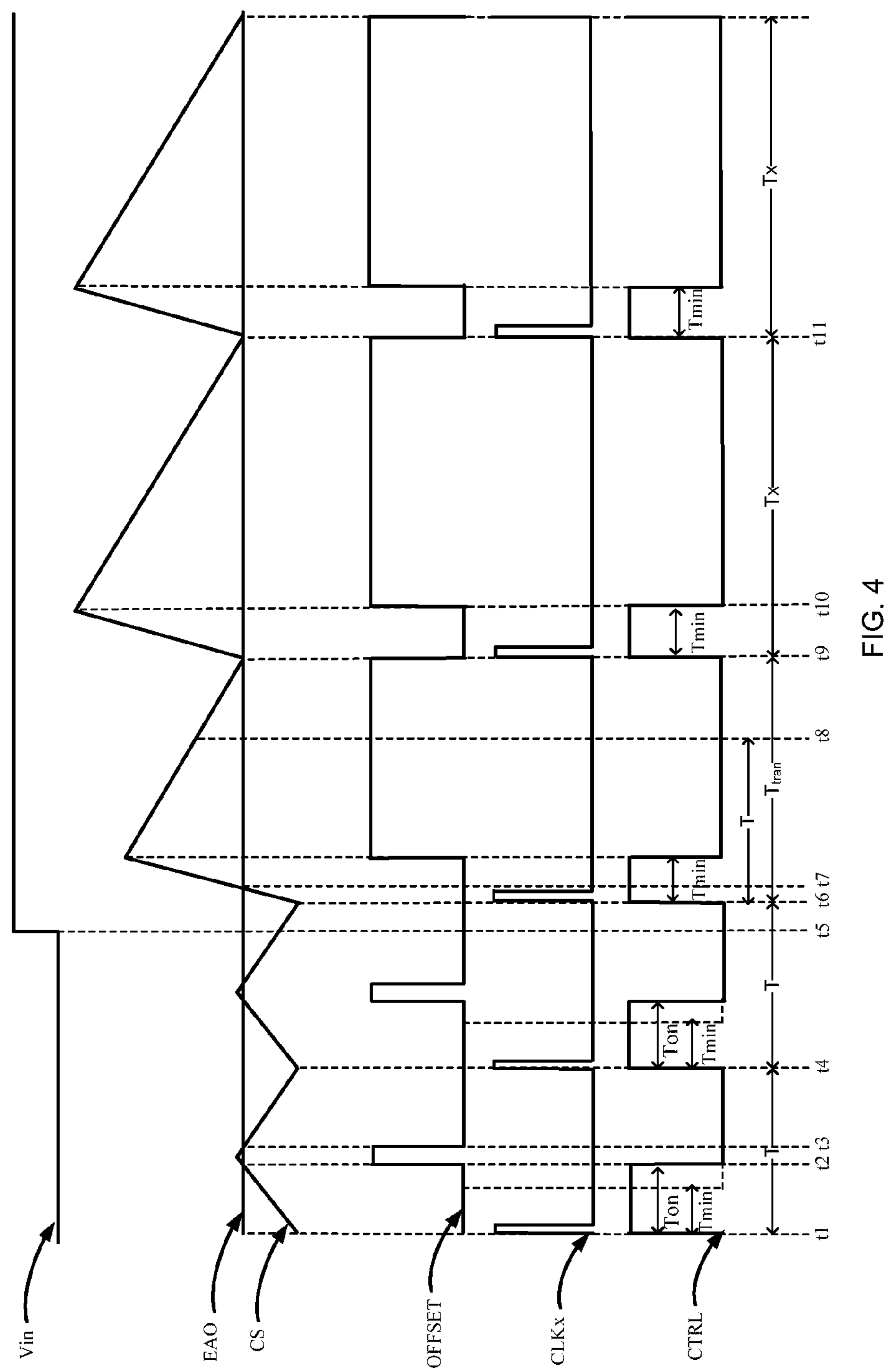
FIG. 4 illustrates a waveform diagram of signals with reference to SMPS 300 in FIG. 3A in accordance with an embodiment of the present invention.

FIG. 4 illustrates a waveform diagram of signals with reference to the SMPS 300 in FIG. 3A in accordance with an embodiment of the present invention. The signals include the input voltage Vin, the error amplified signal EAO, the inductor current sense signal CS, the off signal OFFSET, the clock signal CLKx and the first control signal CTRL. The period of a clock signal is defined as the time duration from one edge to the next same edge, for example, the period of the clock signal CLKx may be defined as the time duration from one raising edge to the next raising edge. Continuing to refer to FIG. 4, when the raising edge of the clock signal CLKx comes, the switch S1 turns on and the synchronous switch S2 turns off, the inductor current sense signal CS increases. When the raising edge of the off signal OFFSET comes, the switch S1 turns off and the synchronous switch S2 turns on, the inductor current sense signal CS decreases. When the required on time of the SMPS Ton is bigger than the minimum on time Tmin, the inductor current sense signal CS is smaller than the error amplified signal EAO after a period of T since the turn-on moment of the switch S1 (T is the preset period of the clock signal CLKx). When the required on time of the SMPS Ton is smaller than the minimum on time Tmin, the inductor current sense signal CS is bigger than the error amplified signal EAO after the period of T since the turn-on moment of the switch S1.

Referring to FIG. 4, at moment t1, the first control signal CTRL transits from logic low to logic high by the trigger of the raising edge of the clock signal CLKx, and the switch S1 turns on. The off signal OFFSET is in logic low during the time duration of Tmin because of the limitation of the minimum on time Tmin. The off signal OFFSET keeps in logic low until moment t2 when the off signal OFFSET transits from logic low to logic high as the inductor current sense signal CS becomes bigger than the error amplified signal EAO. At moment t2, the first control signal CTRL transits from logic high to logic low by the trigger of the raising edge of the off signal OFFSET, thus, the switch S1 turns off and the synchronous switch S2 turns on, the inductor current sense signal CS decreases accordingly. In the waveform of FIG. 4, the time duration from moment t2 to moment t3 is generated and determined by the inherent signal transition delay of the internal circuit and can be omitted in this application. The inductor current sense signal CS decreases and reaches the error amplified signal EAO at moment t3, then the off signal OFFSET transits from logic high to logic low. At moment t4, after the period of T from moment t1 (T is the preset period of the clock signal CLKx), the off signal OFFSET is in logic low, which means the required on time of the SMPS Ton is bigger than the minimum on time Tmin. At moment t4, the next raising edge of the clock signal CLKx comes, and the SMPS 300 starts a next switching period. The period of the clock signal CLKx is T which is illustratively the time duration from moment t1 to moment t4, for example, and the frequency of the clock signal CLKx is F.

At moment t5, the input voltage Vin increases, and the required on time of the SMPS Ton is decreased to be smaller than the minimum on time Tmin. At moment t6, the first control signal CTRL transits from logic low to logic high to turn on the switch S1 by the trigger of the raising edge of the clock signal CLKx. At moment t7, the inductor current sense signal CS increases and reaches the error amplified signal EAO. Compared with working in the preset frequency F (for example, from moment t1 to moment t5), the raising slope rate of the inductor current sense signal CS is increased because of the increase of the input voltage Vin, thus the time duration from moment t6 (when the raising edge of the clock signal CLKx comes) to the moment t7 (when the inductor current sense signal CS increases to the error amplified signal EAO) is decreased to be smaller than the minimum on time Tmin. But because of the limitation of the minimum on time Tmin, the off signal OFFSET transits from logic low to logic high only after the minimum on time Tmin. At moment t8, the off signal OFFSET is in logic high as the inductor current sense signal CS is bigger than the error amplified signal EAO. At moment t9, the inductor current sense signal CS decreases to reach the error amplified signal EAO, thus the off signal OFFSET transits from logic high to logic low, and the raising edge of the clock signal CLKx comes accordingly, the SMPS 300 starts a next switching period. The period of the clock signal CLKx is changed from the preset period T to an adjustment period Tran which is illustratively the time duration from moment t6 to moment t9.

After the adjustment period Tran, at moment t9, the switch S1 turns on by the trigger of the raising edge of the clock signal CLKx. The switch S1 keeps in on state for the minimum on time Tmin. At moment t10, the switch S1 turns off and the synchronous switch S2 turns on, the inductor current sense signal CS decreases and reaches the error amplified signal EAO at moment t11, thus the off signal OFFSET transits from logic high to logic low, and the raising edge of the clock signal CLKx comes accordingly, and the SMPS 300 starts a next switching period. The SMPS 300 has a period of Tx and a frequency of Fx correspondingly.

Figure 5:
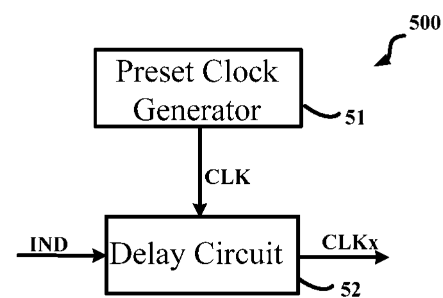
FIG. 5 illustrates a clock circuit 500 with adaptive clock generation in accordance with an embodiment of the present invention.

FIG. 5 illustrates a clock circuit 500 with adaptive clock generation in accordance with an embodiment of the present invention. The clock circuit 500 comprises a preset clock generator 51 and a delay circuit 52. The preset clock generator 51 has an output terminal to provide a preset clock signal CLK with a preset frequency of F. The delay circuit 52 has a first input terminal, a second input terminal and an output terminal, wherein the first input terminal is coupled to an indication signal IND, the second input terminal is coupled to the preset clock generator 51 to receive the preset clock signal CLK, and the output terminal provides a clock signal CLKx to set the switching frequency of the SMPS. When the required on time of the SMPS Ton is bigger than the minimum on time Tmin, the delay circuit 52 outputs the preset clock signal CLK as the clock signal CLKx. When the required on time of the SMPS Ton is smaller than the minimum on time Tmin, the delay circuit 52 delays the effective edge of the preset clock signal CLK based on the indication signal IND to form the clock signal CLKx. In an embodiment, other signals can be reused as the indication signal IND. For example, the off signal OFFSET can be reused as the indication signal IND.

Figure 6:
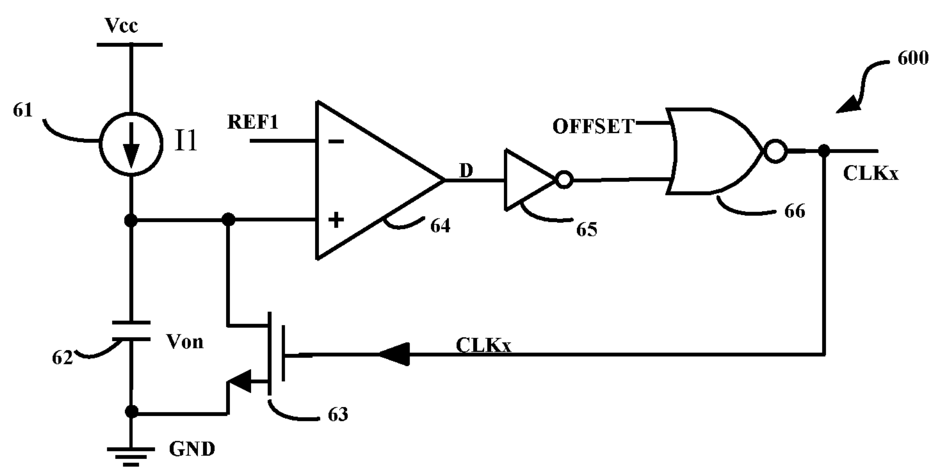
FIG. 6 illustrates a block diagram of a clock circuit 600 with adaptive clock generation in accordance with an embodiment of the present invention.

FIG. 6 illustrates a block diagram of a clock circuit 600 with adaptive clock generation in accordance with an embodiment of the present invention. The clock circuit 600 provides a clock signal CLKx based on the required on time of the SMPS Ton. The Clock circuit 600 comprises a current source 61, a capacitor 62, a switch transistor 63, a comparator 64, an inverter 65 and a NOR gate 66. The current source 61 has a first terminal and a second terminal, wherein the first terminal is coupled to a supply voltage VCC and the second terminal provides a current I1. The capacitor 62 has a first terminal coupled to the second terminal of the current source 61 and a second terminal coupled to a reference ground GND. The current source 61 charges the capacitor 62 to form a voltage Von on the capacitor 62. The switch transistor 63 has a first terminal coupled to the common node of the current source 61 and the capacitor 62, a second terminal coupled to the reference ground GND and a control terminal coupled to the clock signal CLKx. The comparator 64 has a first input terminal (+), a second input terminal (−) and an output terminal, wherein the first input terminal is coupled to the common terminal of the current source 61, the capacitor 62 and the switch transistor 63, and the second input terminal is coupled to a reference voltage REF1. The comparator 64 outputs a comparing signal D at the output terminal by comparing the voltage Von on capacitor 62 with the reference voltage REF1. The inverter 65 has an input terminal and an output terminal, wherein the input terminal is coupled to the output terminal of the comparator 64 to receive the comparing signal D. The NOR gate 66 has a first input terminal, a second input terminal and an output terminal, wherein the first input terminal is coupled to the output terminal of the inverter 65, the second input terminal is coupled to an off signal OFFSET and the output terminal provides the clock signal CLKx.

Figure 7:
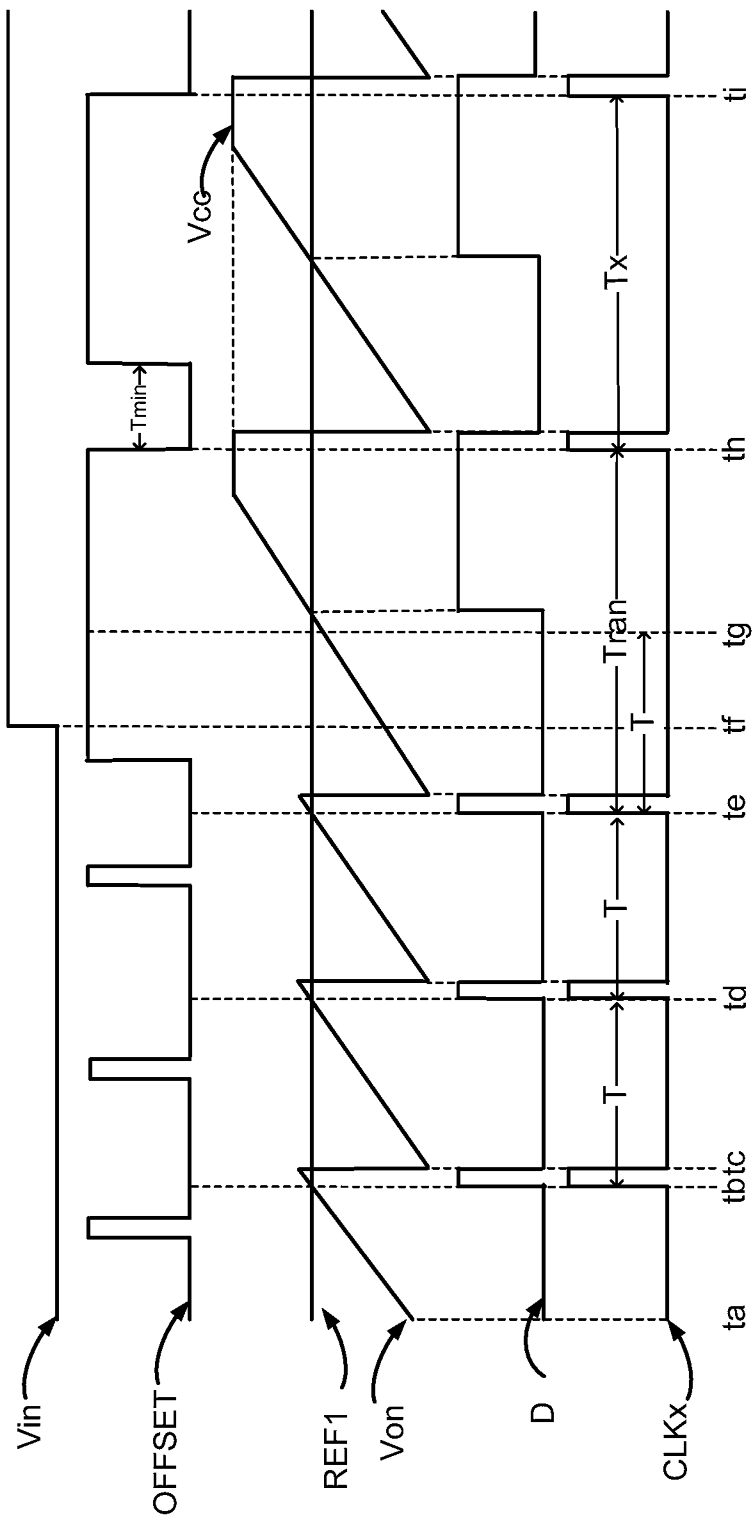
FIG. 7 illustrates a waveform diagram of signals with reference to the clock circuit 600 to illustrate the working principle and the function of clock circuit 600 in accordance with an embodiment of the present invention.

FIG. 7 illustrates a waveform diagram of signals with reference to the clock circuit 600 to illustrate the working principle and the function of clock circuit 600 in accordance with an embodiment of the present invention. The signals include the input voltage Vin, the off signal OFFSET, the reference voltage REF1, the voltage Von on capacitor 62, the comparing signal D of the comparator 64 and the clock signal CLKx. As described in above, the period of a clock signal is defined as the time duration from one edge to the next same edge.

At first, supposing the required on time of the SMPS Ton is bigger than the minimum on time Tmin, so the off signal OFFSET is in logic low at the end of a period of T since the turn-on moment of the switch S1 accordingly. As shown in FIG. 7, at moment ta, the clock signal CLKx is in logic low, the switch transistor 63 turns off, the current I1 starts to charge capacitor 62, the voltage Von on capacitor 62 increases. At moment tb, the voltage Von on capacitor 62 increases to reach the reference voltage REF1, the comparing signal D transits from logic low to logic high. Thus, as the off signal OFFSET is in logic low at moment tb, the clock signal CLKx determined by the off signal OFFSET and the comparing signal D transits from logic low to logic high to turn on the switch transistor 63, thus the capacitor 62 starts to discharge energy and the voltage Von on capacitor 62 drops quickly. At moment tc, the voltage Von on capacitor 62 decreases to zero, the comparing signal D transits from logic high to logic low accordingly. The clock signal CLKx determined by the off signal OFFSET and the comparing signal D transits from logic high to logic low. The switch transistor 63 turns off again and the current source 61 starts to charge the capacitor 62 again. At moment td, the voltage Von on capacitor 62 is bigger than the reference voltage REF1, thus the comparing signal D transits from logic low to logic high. Thus, the clock signal CLKx transits from logic low to logic high, and the next raising edge of the clock signal CLKx comes. The preset period of the clock signal CLKx is illustratively the time duration T from moment tb to moment td.

At moment tf, the required on time of the SMPS Ton is smaller than the minimum on time Tmin because of the increase of input voltage Vin. The off signal OFFSET is in logic high at moment tg, the period of T since the turn-on moment of the switch S1 (moment te) accordingly. The off signal OFFSET keeps in logic high until moment th. At moment th, the clock signal CLKx determined by the off signal OFFSET and the comparing signal D transits from logic low to logic high, and the raising edge of the clock signal CLKx comes. It can be seen from FIG. 7 that the period of the clock signal CLKx is changed from the preset period T (e.g., from moment te to moment tg) to an adjustment period Tran (e.g., from moment te to moment th). At moment ti, the clock signal CLKx transits from logic low to logic high, the raising edge of the clock signal CLKx comes. It can be see form FIG. 7 that after an adjustment period of Tran, the period of the clock signal CLKx is changed from the adjustment period Tran to a period Tx. In response, the clock signal CLKx decreases from the preset frequency F to the frequency Fx.

As shown in FIG. 7, the clock circuit 600 generates the clock signal CLKx based on the off signal OFFSET indicative of the required on time of the SMPS Ton. When the required on time of the SMPS Ton is bigger than the minimum on time Tmin, the off signal OFFSET is in logic low after the period of T since the turn-on moment of the switch S1. According to the clock circuit 600 as shown in FIG. 6, the period of the clock signal CLKx is T, and the frequency of the clock signal CLKx is the preset frequency F. When the required on time of the SMPS Ton is smaller than the minimum on time Tmin, the off signal OFFSET is in logic high after the period of T since the turn-on moment of the switch S1, clock circuit 600 provides the clock signal CLKx with the period of Tx and the frequency of Fx, wherein the frequency Fx is smaller than the preset frequency F.

Figure 8:
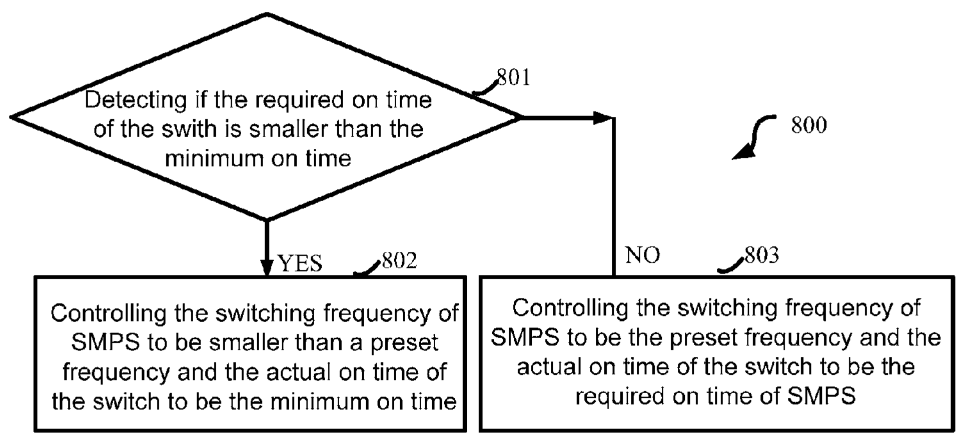
FIG. 8 illustrates a method 800 of controlling a SMPS in accordance with an embodiment of the present invention.

FIG. 8 illustrates a method 800 of controlling a SMPS in accordance with an embodiment of the present invention. The SMPS comprises a switch having a minimum on time Tmin. The SMPS converts an input voltage Vin at an input terminal to an output voltage Vout at an output terminal by controlling the switching operation of the switch. As shown in FIG. 8, the method 800 comprises steps 801, 802 and 803. Step 801: detecting if the required on time of the SMPS Ton is smaller than the minimum on time Tmin. When the required on time of the SMPS Ton is detected being smaller than the minimum on time Tmin, please refer to Step 802: controlling the switching frequency of the SMPS to be smaller than a preset frequency of the SMPS, and the actual on time of the switch to be the minimum on time Tmin. When the required on time of the SMPS Ton is detected being bigger than the minimum on time Tmin, please refer to step 803: controlling the switching frequency of the SMPS to be the preset frequency, and the actual on time of the switch to be the required on time of the SMPS Ton.

In an embodiment, the step 802 of method 800 further comprises: when the required on time of the SMPS Ton is smaller than the minimum on time Tmin, controlling the switching frequency of the SMPS to be positively correlated to the required on time of the SMPS Ton. In another embodiment, when the required on time of the SMPS Ton is smaller than the minimum on time Tmin, controlling the switching frequency of the SMPS to be inversely correlated to the input voltage Vin and positively correlated to the output voltage Vout.

In the above embodiments, "the first state" refers to logic low, "the second state" refers to logic high, but it should be known that the first state can be logic high and the second state can be logic low.

It will be appreciated by persons skilled in the art that the present invention is not limited to what has been particularly shown and described herein above. Rather the scope of the present invention is defined by the claims and includes both combinations and sub-combinations of the various features described herein above as well as variation and modifications thereof which would occur to persons skilled in the art upon reading the foregoing description and which are not in the prior art.

What is claimed is:

1. A controller for controlling a switching mode power supply (SMPS), wherein the SMPS comprises a switch with a minimum on time, and the SMPS converts an input voltage to an output voltage, the controller comprising:

a clock circuit, configured to generate a clock signal to control the turn on moment of the switch, wherein when the required on time of the switch for converting the input voltage to a target output voltage is bigger than the minimum on time, the frequency of the clock signal is controlled to be a preset frequency, when the required on time of the switch is smaller than the minimum on time, the frequency of the clock signal is controlled to be positively correlated to the required on time of the switch;

an off signal generator, configured to generate an off signal to control the actual on time of the switch, wherein when the required on time of the switch is bigger than the minimum on time, the actual on time of the switch is controlled to be the required on time of the switch, when the required on time of the switch is smaller than the minimum on time, the actual on time of the switch is controlled to be the minimum on time; and a logic circuit, coupled to the clock circuit and the off signal generator, wherein the logic circuit is configured to control the switching operation of the switch based on the clock signal and the off signal.

2. The controller of claim 1, wherein when the required on time of the switch is smaller than the minimum on time, the frequency of the clock signal is inversely correlated to the input voltage and positively correlated to the output voltage.

3. The controller of claim 1, wherein the controller further comprises a module detection circuit configured to generate an indication signal based on the required on time of the switch and a minimum on time signal indicative of the minimum on time, and wherein the clock circuit is configured to generate the clock signal based on the indication signal.

4. The controller of claim 3, wherein the clock circuit comprises:

a preset clock generator, configured to provide a preset clock signal with the preset frequency; and a delay circuit, configured to receive the preset clock signal and the indication signal, and wherein when the indication signal indicates the required on time of the switch is bigger than the minimum on time, the preset clock signal is provided as the clock signal, when the indication signal indicates the required on time of the switch is smaller than the minimum on time, the effective edge of the preset signal is delayed for a period of time to form the clock signal.

5. The controller of claim 4, wherein the indication signal is the off signal.

6. The controller of claim 1, wherein the clock circuit comprises:

a current source, having a first terminal and a second terminal, wherein the first terminal is coupled to a supply voltage and the second terminal is configured to provide a current;

a capacitor, having a first terminal and a second terminal, wherein the first terminal is coupled to the second terminal of the current source, and the second terminal is coupled to a reference ground;

a switch transistor, having a first terminal, a second terminal and a control terminal, wherein the first terminal is coupled to the second terminal of the current source and the first terminal of the capacitor, the second terminal is coupled to the reference ground, and the control terminal is coupled to the clock signal;

a comparator, having a first input terminal, a second input terminal and an output terminal, wherein the first input terminal is coupled to the second terminal of the current source and the first terminal of the capacitor, the second input terminal is configured to receive a reference voltage, and the output terminal is configured to provide a comparing signal;

an inverter, having an input terminal and an output terminal, wherein the input terminal is coupled to the output terminal of the comparator to receive the comparing signal; and a NOR gate, having a first input terminal, a second input terminal and an output terminal, wherein the first input terminal is coupled to the output terminal of the inverter, the second input terminal is coupled to an indication signal, and the output terminal is configured to provide the clock signal.

7. The controller of claim 1, wherein the SMPS comprises an output inductor, the off signal generator comprises:

an amplifier, configured to generate an error amplified signal based on a reference signal and a feedback signal indicative of the output voltage;

a comparator, configured to generate a comparison signal based on the error amplified signal and an inductor current sense signal indicative of the inductor current flowing through the output inductor; and an AND gate, having a first input terminal, a second input terminal and an output terminal, wherein the first input terminal is coupled to the comparator to receive the comparison signal, the second input terminal is coupled to a minimum on time signal indicative of the minimum on time, and the output terminal is configured to provide the off signal.

8. The controller of claim 1, wherein the SMPS comprises an output inductor, the off signal generator comprises:

an amplifier, configured to generate an error amplified signal based on a reference signal and a feedback signal indicative of the output voltage; and a comparator, having a first input terminal, a second input terminal, a control terminal and an output terminal, wherein the first input terminal is coupled to the error amplified signal, the second input terminal is coupled to an inductor current sense signal indicative of the inductor current flowing through the output inductor, and the control terminal is configured to receive a minimum on time signal indicative of the minimum on time, and wherein the comparator is configured to generate a comparison signal as the off signal based on the error amplified signal, the inductor current sense signal and the minimum on time signal, and wherein when the minimum on time signal is in an effective state, the off signal is in an ineffective state.

9. The controller of claim 1, wherein the logic circuit comprises a RS-trigger coupled to the clock circuit and the off signal generator to respectively receive the clock signal and the off signal, and wherein the RS-trigger is configured to generate a control signal to control the switching operation of the switch based on the clock signal and the off signal.

10. A switching mode power supply (SMPS) for converting an input voltage to an output voltage, the SMPS comprising:

a switching circuit comprising a switch with a minimum on time; and a controller, comprising:

a clock circuit, configured to generate a clock signal to control the turn on moment of the switch, wherein when the required on time of the switch for converting the input voltage to a target output voltage is bigger than the minimum on time, the frequency of the clock signal is controlled to be a preset frequency, when the required on time of the switch is smaller than the minimum on time, the frequency of the clock signal is controlled to be positively correlated to the required on time of the switch;

an off signal generator, configured to generate an off signal to control the actual on time of the switch, wherein when the required on time of the switch is bigger than the minimum on time, the actual on time of the switch is controlled to be the required on time of the switch, when the required on time of the switch is smaller than the minimum on time, the actual on time of the switch is controlled to be the minimum on time; and a logic circuit, coupled to the clock circuit and the off signal generator, wherein the logic circuit is configured to control the switching operation of the switch based on the clock signal and the off signal.

11. The SMPS of claim 10, wherein when the required on time of the switch is smaller than the minimum on time, the frequency of the clock signal is inversely correlated to the input voltage, and positively correlated to the output voltage.

12. The SMPS of claim 10, wherein the controller further comprises a module detection circuit configured to generate an indication signal based on the required on time of the SMPS and a minimum on time signal indicative of the minimum on time, and wherein the clock circuit is configured to generate the clock signal based on the indication signal.

13. The SMPS of claim 12, wherein the clock circuit comprises:

a preset clock generator, configured to provide a preset clock signal with the preset frequency; and a delay circuit, configured to receive the preset clock signal, and the indication signal, and wherein when the indication signal indicates the required on time of the switch is bigger than the minimum on time, the preset clock signal is provided as the clock signal, when the indication signal indicates the required on time of the switch is smaller than the minimum on time, the effective edge of the preset signal is delayed for a period of time signal to form the clock signal.

14. The SMPS of claim 10, wherein the clock circuit comprises:

a current source, having a first terminal and a second terminal, wherein the first terminal is coupled to a supply voltage and the second terminal is configured to provide a current;

a capacitor, having a first terminal and a second terminal, wherein the first terminal is coupled to the second terminal of the current source, and the second terminal is coupled to a reference ground;

a switch transistor, having a first terminal, a second terminal and a control terminal, wherein the first terminal is coupled to the second terminal of the current source and the first terminal of the capacitor, the second terminal is coupled to the reference ground and the control terminal is coupled to the clock signal;

a comparator, having a first input terminal, a second input terminal and an output terminal, wherein the first input terminal is coupled to the second terminal of the current source and the first terminal of the capacitor, the second input terminal is configured to receive a reference voltage, and the output terminal is configured to provide a comparing signal;

an inverter, having an input terminal and an output terminal, wherein the input terminal is coupled to the output terminal of the comparator to receive the comparing signal; and a NOR gate, having a first input terminal, a second input terminal and an output terminal, wherein the first input terminal is coupled to the output terminal of the inverter, the second input terminal is coupled to an indication signal and the output terminal is configured to provide the clock signal.

15. The SMPS of claim 10, wherein the SMPS comprises an output inductor, the off signal generator comprises:

an amplifier, configured to generate an error amplified signal based on a reference signal and a feedback signal indicative of the output voltage;

a comparator, configured to generate a comparison signal based on the error amplified signal and an inductor current sense signal indicative of the inductor current flowing through the output inductor; and an AND gate, having a first input terminal, a second input terminal and an output terminal, wherein the first input terminal is coupled to the comparator to receive the comparison signal, the second input terminal is coupled to a minimum on time signal indicative of the minimum on time, and the output terminal is configured to provide the off signal.

16. The SMPS of claim 10, wherein the SMPS comprises an output inductor, the off signal generator comprises:

an amplifier, configured to generate an error amplified signal based on a reference signal and a feedback signal indicative of the output voltage; and a comparator, having a first input terminal, a second input terminal, a control terminal and an output terminal, wherein the first input terminal is coupled to the error amplified signal, the second input terminal is coupled to an inductor current sense signal indicative of the inductor current flowing through the output inductor, and the control terminal is configured to receive a minimum on time signal indicative of the minimum on time, and wherein the comparator is configured to generate an comparison signal as the off signal based on the error amplified signal, the inductor current sense signal and the minimum on time signal, and wherein when the minimum on time signal is in an effective state, the off signal is in an ineffective state.

17. The SMPS of claim 10, wherein the logic circuit comprises a RS-trigger coupled to the clock circuit and the off signal generator to respectively receive the clock signal and the off signal, and wherein the RS-trigger is configured to generate a control signal to control the switching operation of the switch based on the clock signal and the off signal.

18. The SMPS of claim 10, wherein the switching circuit comprises:

the switch with the minimum on time, wherein the switch has a first terminal, a second terminal and a control terminal, and wherein the first terminal is configured to receive the input voltage, the second terminal is coupled to a switching node, and the control terminal is controlled by the logic circuit;

a synchronous switch, having a first terminal and a second terminal, wherein the first terminal is coupled to the switching node and the second terminal is coupled to a reference ground;

an output inductor, having a first terminal and a second terminal, wherein the first terminal is coupled to the switching node; and an output capacitor, having a first terminal and a second terminal, wherein the first terminal is coupled to the second terminal of the output inductor to provide the output voltage, and the second terminal is coupled to the reference ground.

19. A method of controlling a SMPS, wherein the SMPS comprises a switch with a minimum on time, the SMPS converts an input voltage to an output voltage by controlling the switch, the method comprising:

detecting if the required on time of the switch for converting the input voltage to a target output voltage is smaller than the minimum on time; and controlling the switching frequency of the SMPS to be smaller than a preset frequency of the SMPS and the actual on time of the switch to be the minimum on time when the required on time of the switch is detected being smaller than the minimum on time, and controlling the switching frequency of the SMPS to be the preset frequency of the SMPS and the actual on time of the switch to be the required on time of the switch when the required on time of the switch is detected being bigger than the minimum on time.

20. The method of claim 19, controlling the switching frequency of the SMPS to be positively correlated to the required on time of the switch when the required on time of the switch is smaller than the minimum on time.

21. The method of claim 19, controlling the switching frequency of the SMPS to be inversely correlated to the input voltage and positively correlated to the output voltage when the required on time of the switch is smaller than the minimum on time.

* * * * *